US010956621B2

United States Patent
Khan et al.

(10) Patent No.: US 10,956,621 B2
(45) Date of Patent: *Mar. 23, 2021

(54) SECURE SYSTEM HAVING A MULTI-LOCKING MECHANISM FOR DEVICES HAVING EMBEDDED SYSTEMS

(71) Applicant: TracFone Wireless, Inc., Miami, FL (US)

(72) Inventors: Shoaib S. Khan, Miami, FL (US); Khurram Humayun Chawdhry, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,558

(22) Filed: Sep. 16, 2019

(65) Prior Publication Data

US 2020/0012821 A1 Jan. 9, 2020

Related U.S. Application Data

(63) Continuation of application No. 15/389,835, filed on Dec. 23, 2016, now Pat. No. 10,417,456.

(60) Provisional application No. 62/387,136, filed on Dec. 23, 2015.

(51) Int. Cl.
*G06F 21/74* (2013.01)
*G06F 21/86* (2013.01)
*G06F 21/88* (2013.01)

(52) U.S. Cl.
CPC ............ *G06F 21/74* (2013.01); *G06F 21/86* (2013.01); *G06F 21/88* (2013.01)

(58) Field of Classification Search
CPC ........... G06F 21/74; G06F 21/86; G06F 21/88
See application file for complete search history.

(56) References Cited

U.S. PATENT DOCUMENTS

| 8,639,214 | B1* | 1/2014 | Fujisaki | H04M 11/007 455/406 |
| 2004/0189439 | A1* | 9/2004 | Cansino | H04L 67/025 340/5.2 |
| 2014/0172721 | A1* | 6/2014 | Weiss | G06F 21/606 705/64 |
| 2016/0028701 | A1* | 1/2016 | Hua | H04L 63/0471 713/151 |

* cited by examiner

*Primary Examiner* — Hee K Song
(74) *Attorney, Agent, or Firm* — BakerHostetler

(57) ABSTRACT

A device configured to implement multiple locks to increase security of assets associated with the device including an embedded system, a multi-lock mechanism configured to provide a plurality of locks to prevent an authorized access to the assets associated with the embedded system, each of the plurality of locks of the multi-lock mechanism having an different unlock parameters, a memory configured to securely store at least one of the lock parameters of the plurality of locks of the multi-lock mechanism, the memory further configured to securely store at least one of the unlock parameters of the multi-lock mechanism, and the embedded system further configured to provide access to the assets after each of the lock parameters of the plurality of locks of the multi-lock mechanism is provided the unlock parameters of the multi-lock mechanism.

20 Claims, 5 Drawing Sheets

SECURE SYSTEM HAVING A MULTI-LOCKING MECHANISM FOR DEVICES HAVING EMBEDDED SYSTEMS

CROSS REFERENCE TO PRIOR APPLICATIONS

This application is a continuation of U.S. patent application Ser. No. 15/389,835, filed Dec. 23, 2016 now U.S. Pat. No. 10,417,456 issued Sep. 17, 2019, which is incorporated herein by reference in its entirety, which claims the benefit from U.S. Provisional Application No. 62/387,136 filed on Dec. 23, 2015, which is hereby incorporated by reference for all purposes as if fully set forth herein.

BACKGROUND OF THE DISCLOSURE

1. Field of the Disclosure

This disclosure relates generally to a system having a multi-locking mechanism. More specifically, this disclosure relates to a system having a multi-locking mechanism for devices having embedded systems.

2. Related Art

Many devices including mobile phones include a functionality to limit the ability to modify or obtain access to various assets or functions of the device. This functionality is generally referred to as a locking mechanism. For example, mobile phones and associated subscriber identity modules (SIM) used in the mobile phones are typically strictly regulated with a locking mechanism such as a SIM lock in order to keep costs low and rate offerings attractive. In this regard, a SIM lock is a locking mechanism built into mobile phones that can be typically used to provide this strict regulation. Network providers typically use this capability to restrict the use of these mobile phones to specific countries, network providers and/or the like. A mobile phone can typically be unlocked by entering a code provided by the network operator. Alternative unlocking mechanisms include software running on the handset, a computer attached to the handset, hardware devices that connect to the handset, and/or over-the-air unlocking by the carrier.

For example, a locked mobile phone will typically display a message if a locked SIM is used, requesting the unlock code. Once a valid code is entered, the handset will typically be unlocked. Hackers have been able to successfully exploit and/or hack the locking mechanisms in an unauthorized manner resulting in loss of revenue and the like. Accordingly, such locking mechanisms are insecure. Other types of devices and systems have similar insecure locking mechanisms that are also subject to exploitation by hackers.

Accordingly, there is a need for a locking mechanism for manufacturers, network operators, and the like to have greater control of the devices and to limit the ability to unlock these devices.

SUMMARY OF THE DISCLOSURE

Aspects of the disclosure advantageously provide a device configured to implement multiple locks to increase security of assets associated with the device including an embedded system, a multi-lock mechanism configured to provide a plurality of locks to prevent an unauthorized access to the assets associated with the embedded system and wherein at least one of the plurality of locks of the multi-lock mechanism includes a secure default lock state, each of the plurality of locks of the multi-lock mechanism having different lock parameters and each of the plurality of locks of the multi-lock mechanism having different unlock parameters, a memory in communication with the embedded system, the memory configured to securely store at least one of the lock parameters of the plurality of locks of the multi-lock mechanism, the memory further configured to securely store at least one of the unlock parameters of the multi-lock mechanism, wherein the memory includes one of the following: a NAND flash memory, double data rate (DDR2) random access memory (RAM), a replay protected memory block (RPMB) memory, an encrypted memory portion, and an eMMC (embedded MultiMediaCard) memory, and the embedded system is further configured to provide access to the assets after each of the lock parameters of the plurality of locks of the multi-lock mechanism is provided the unlock parameters of the multi-lock mechanism, where the device includes one of the following: a wireless device, an appliance, a consumer electronic, a vehicle related device, a server, and a medical device.

The plurality of locks of the multi-lock mechanism may be implemented with at least two of the following: a trustzone security extension, a trusted execution environment, and a network over the air (OTA) high level operating system (HLOS) client. The plurality of locks of the multi-lock mechanism may be implemented with at least two of the following: a trustzone security extension, a trusted execution environment, a network over the air (OTA) high level operating system (HLOS) client, a service provider code lock, a master subsidy lock, and a port security permission set lock. The plurality of locks of the multi-lock mechanism may be implemented with at least three of the following: a trustzone security extension, a trusted execution environment, a network over the air (OTA) high level operating system (HLOS) client, a service provider code lock, a master subsidy lock, and a port security permission set lock. The device may include hardware fuses implemented with the embedded system configured to blow in response to tampering. The device may include a crypto/security engine implemented with the embedded system. The embedded system may be implemented with a high level operating system (HLOS); and wherein the embedded system may include a system on a chip. The embedded system may be configured to execute run-time integrity checking. The embedded system may be configured to execute a tamper detection feature that transparently runs to monitor a security profile. The embedded system may include a timing parameter that requires each of the lock parameters to be provided the unlock parameters in a timely manner.

Aspects of the disclosure advantageously provide a process configured to implement multiple locks to increase security of assets associated with a device including implementing the device with an embedded system, providing a multi-lock mechanism with a plurality of locks to prevent an unauthorized access to the assets associated with the embedded system and wherein at least one of the plurality of locks of the multi-lock mechanism includes a secure default lock state, implementing each of the plurality of locks of the multi-lock mechanism with different lock parameters and implementing each of the plurality of locks of the multi-lock mechanism with different unlock parameters, securely storing at least one of the lock parameters of the plurality of locks of the multi-lock mechanism in a memory in communication with the embedded system, securely storing at least one of the unlock parameters of the multi-lock mechanism in the memory in communication with the embedded system, where the memory includes one of the following: a NAND flash memory, double data rate (DDR2) random access memory (RAM), a replay protected memory block (RPMB) memory, an encrypted memory portion, and an eMMC (embedded MultiMediaCard) memory, and providing access to the assets after each of the lock parameters of the plurality of locks of the multi-lock mechanism is provided the unlock parameters of the multi-lock mechanism of the embedded system, where the device includes one of the following: a wireless device, an appliance, a consumer electronic, a vehicle related device, a server, and a medical device.

The plurality of locks of the multi-lock mechanism may be implemented with at least two of the following: a trustzone security extension, a trusted execution environment, and a network over the air (OTA) high level operating system (HLOS) client. The plurality of locks of the multi-lock mechanism may be implemented with at least two of the following: a trustzone security extension, a trusted execution environment, a network over the air (OTA) high level operating system (HLOS) client, a service provider code lock, a master subsidy lock, and a port security permission set lock. The plurality of locks of the multi-lock mechanism may be implemented with at least three of the following: a trustzone security extension, a trusted execution environment, a network over the air (OTA) high level operating system (HLOS) client, a service provider code lock, a master subsidy lock, and a port security permission set lock. The process according may include implementing hardware fuses with the embedded system configured to blow in response to tampering. The process may include implementing a crypto/security engine with the embedded system. The embedded system may be implemented with a high level operating system (HLOS); and wherein the embedded system comprises a system on a chip. The process may further include implementing a run-time integrity checking with the embedded system. The process may further include implementing a tamper detection feature that transparently runs to monitor a security profile with the embedded system. The process may further include implementing a timing parameter that requires each of the lock parameters to be provided the unlock parameters in a timely manner with the embedded system.

Earlier solutions to locking mechanisms did not address the unauthorized unlocking of a device from an embedded systems wide perspective in a holistic manner in a context of secure design and from an attack surface perspective to greatly reduce the possibility for hacking. In addition, certain critical features were absent from the locking mechanism solutions such as tamper detection, a secure default lock state, and the like.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

In the description that follows, the disclosure may be described in reference to one or more aspects for providing a multi-lock mechanism for a device. The disclosure, however, is not limited to any particular application nor is it limited by the examples described below. Various modifications to the disclosed aspects may be apparent to those skilled in the art and the general principles defined herein may be applied to other aspects and applications without departing from the spirit and scope of the disclosures. Therefore, the description of the aspects that follow are for purposes of illustration and not limitation.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
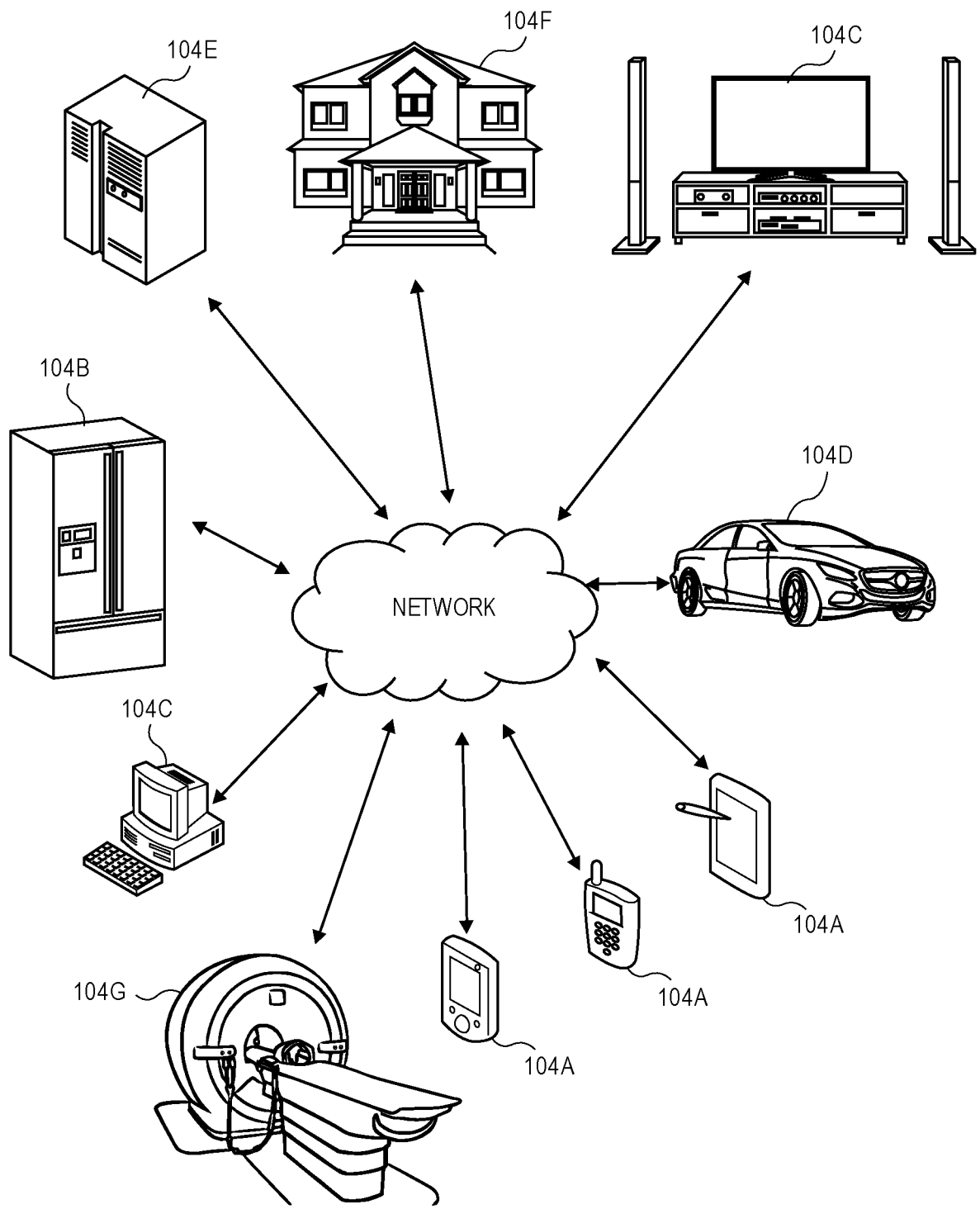
FIG. 1 illustrates various devices that may connect to a network in accordance with aspects of the disclosure.

FIG. 1 illustrates various devices that may connect to a network in accordance with aspects of the disclosure. Each of the mobile devices 104A-104G shown in FIG. 1 include a multi-lock mechanism according to the disclosure. Each of the mobile devices 104A-104G may or may not connect with a network along a communication channel is defined herein.

In this regard, a device 104 implemented as a mobile device 104A is intended to encompass any compatible mobile technology computing device that connects to a wireless communication network and utilizes a UICC, SIM card, or the like, such as mobile phones, mobile equipment, mobile stations, user equipment, cellular phones, smartphones or the like (e.g., Apple iPhone, iPad, Google Android based devices, BlackBerry based devices, other types of PDAs or smartphones), wireless dongles, wireless access points, devices implemented as an Internet of things (IoT), or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network to provide mobile phone services through the use of a wireless device having a SIM card installed therein, such as the Global System for Mobile Communication (GSM) network. However, other cellular wireless communication protocols, such as CDMA or the like, may utilize the teachings of the present application for the device 104 implemented as a mobile device 104A. Such mobile devices 104A are shown in FIG. 1.

Additionally, the device 104 as referenced in this application is meant to cover other types of devices utilizing an embedded system. Such other devices may include appliances 104B, consumer electronics 104C, vehicle related devices 104D, servers 104E, medical devices 104G, and the like. Appliances 104B may include any appliances with embedded systems including microwaves, refrigerators, HVAC systems, and the like. Consumer electronics 104C may include any consumer-electronics with embedded systems including televisions, stereos, digital video recorders (DVRs), DVD players, security systems 104F, home automation systems 104F, entry lock systems 104F, personal computers, wireless access points, and the like. The vehicle related devices 104D may include any vehicles having devices with embedded systems, such as those utilizing an electronic control module (ECM), automotive security systems, aftermarket products, global navigation satellite system (GNSS) devices, and the like. The medical devices 104G may include anesthetic equipment, dental equipment, emergency medical equipment, medical imaging equipment, medical testing equipment, ophthalmic equipment, medical pumps, medical robots, veterinary equipment, and the like. However, for brevity and to simplify the description herein, each of these implementations will be described generically as a device 104.

Figure 2:
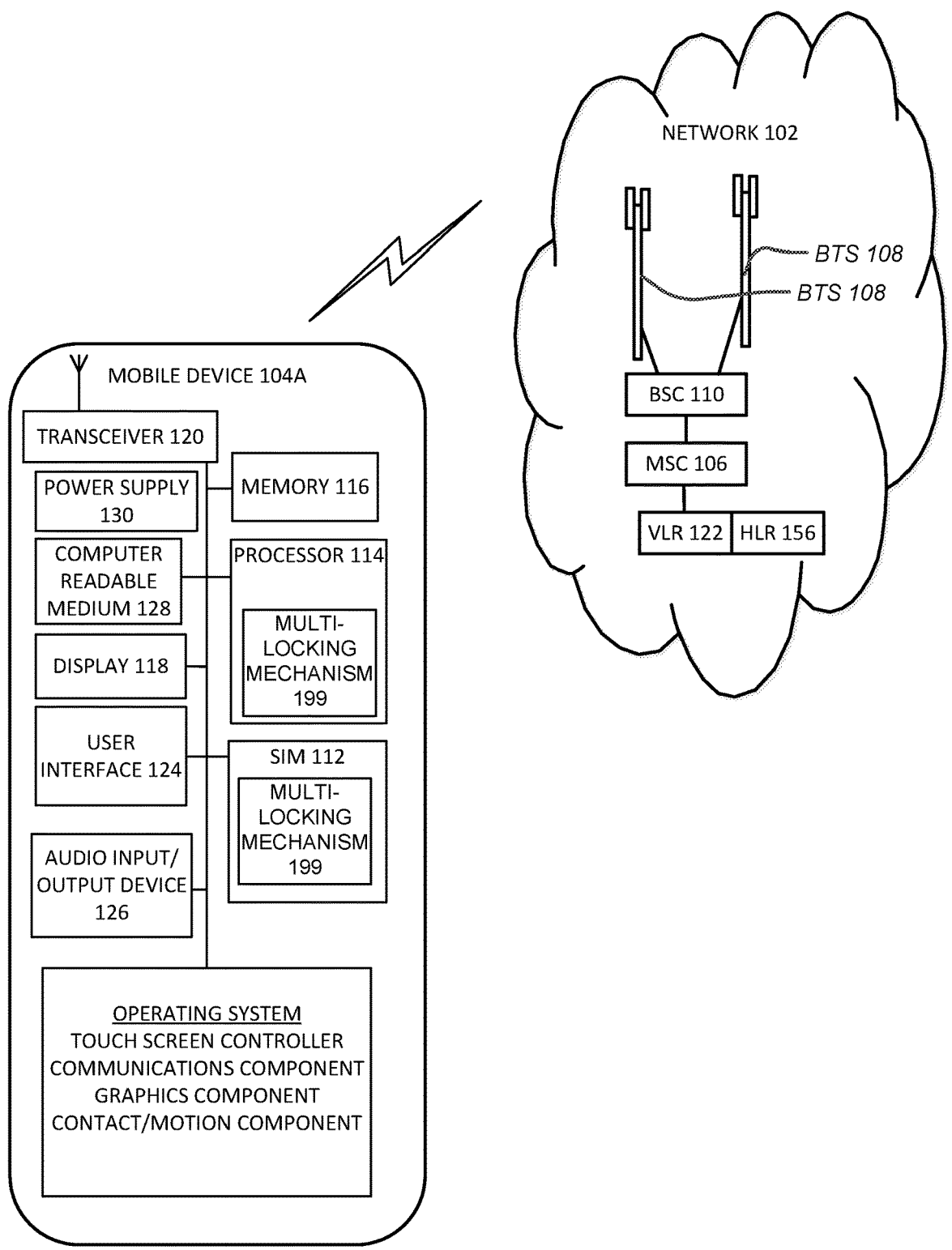
FIG. 2 illustrates a particular device connected to a network in accordance with aspects of the disclosure.

FIG. 2 shows a device 104 implemented as a mobile device 104A and a network in accordance with aspects of the disclosure. The mobile device 104A provides the radio and signal processing needed to access a network 102 for services. The network 102 may be a GSM network or any other network operating consistent with a protocol utilizing a communication channel as defined herein. The mobile device 104A includes a processor 114, memory 116, display 118, transceiver 120, user interface 124, and the like. The processor 114 is configured to process call functions, provide other services to the user, and may also operate in conjunction with a multi-lock mechanism 199. It should be noted that the multi-lock mechanism 199 may also exist on a subscriber identification module (SIM) 112, on dedicated hardware including semiconductors, application specific integrated circuits (ASIC), programmable logic arrays, and other hardware devices. The mobile device 104A may further include a user interface 124, an audio input/output device 126, a computer readable medium 128, and a power supply 130. The other types of devices 104 may include similar components including the processor 114, memory 116, display 118, transceiver 120, user interface 124, and the like.

The SIM 112 may be associated with the mobile device 104A. The SIM 112 may be an integrated circuit that may store an International Mobile Subscriber Identity (IMSI) and also may store a key used to identify and authenticate subscribers on the mobile device 104A and other devices 104. The SIM 112 may be configured to be transferred between different mobile devices. The SIM 112 may also store network-specific information used to authenticate and identify subscribers on the network 102. The network-specific information may include the ICCID, Authentication Key (Ki), Local Area Identity (LAI), Operator-Specific Emergency Number, and so on.

FIG. 2 further shows that the network 102 may include a Mobile services Switching Center (MSC) 106 that may perform the switching of calls and that may include a Visitor Location Register (VLR) 122. The network 102 may also include a Base Transceiver Station (BTS) 108 and a Base Station Controller (BSC) 110. The Base Transceiver Station 108 houses the radio transceivers that define a cell and handle the radio-link protocols with the mobile device 104A. The Base Station Controller 110 manages the radio resources for one or more Base Transceiver Station 108. The Base Station Controller 110 is the connection between the mobile device 104A and the Mobile service Switching Center (MSC) 106.

A Home Location Register (HLR) 156 and the VLR 122 together with the MSC 106, provide the call-routing and roaming capabilities. The HLR contains all the administrative information of each subscriber registered in the corresponding network 102, along with the current location of the mobile device 104A. The devices 104 may also be configured to connect to another type of wireless network on a communication channel as defined herein.

The device 104 of the disclosure, including the mobile device 104A, may use the multi-lock mechanism 199 that may be unlocked using various methods including, but not limited to, a network Over-the-air (OTA) unlocking which can be initiated by the customer/network via a high level operating system (HLOS) client, a TrustZone security extension, a Trusted Execution Environment (TEE) client/SMS using unlock codes/certificates as well as manual unlocking via entry of unlock codes by an end user.

Figure 3:
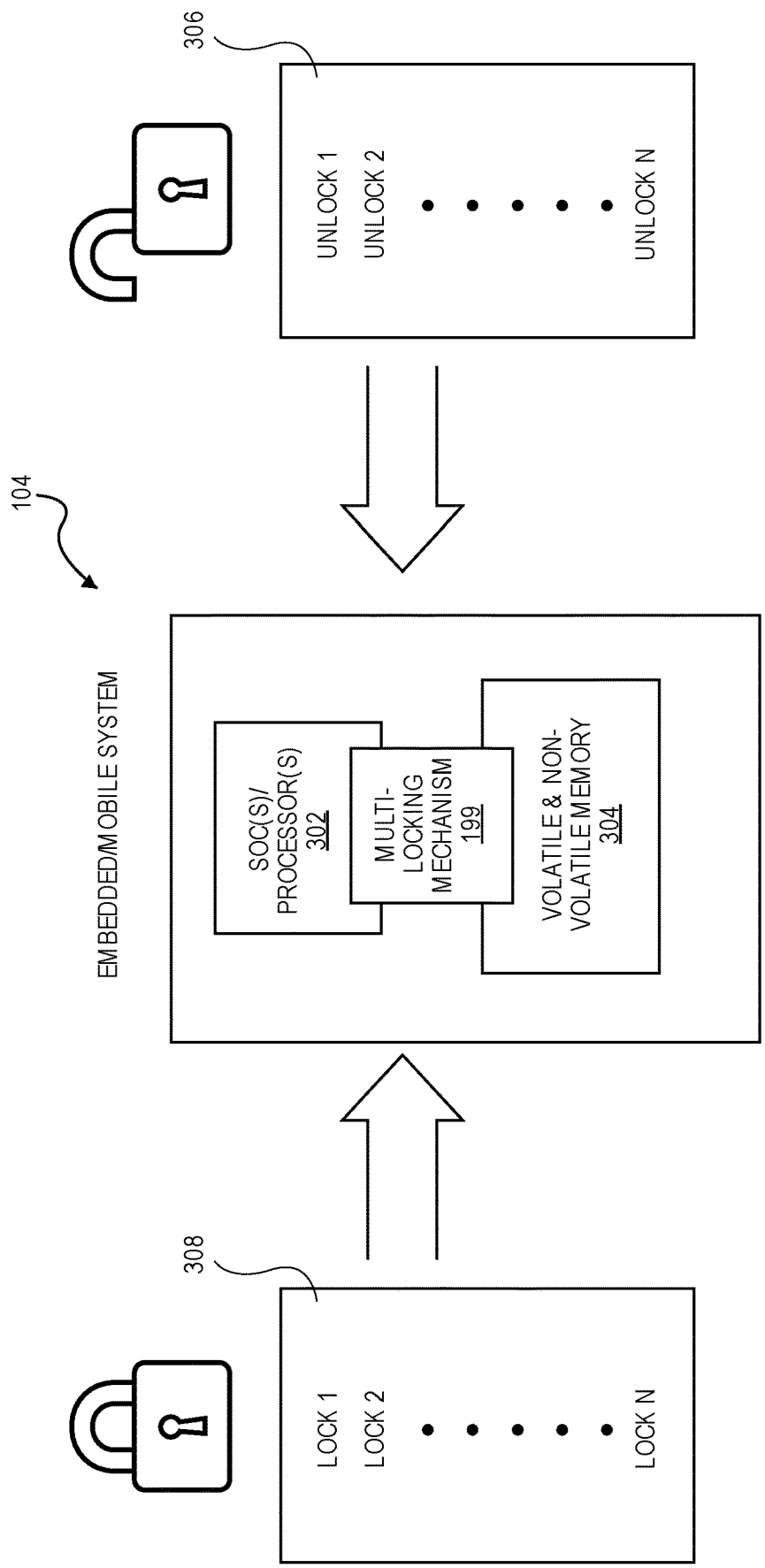
FIG. 3 schematically illustrates a device and multi-lock mechanisms in accordance with aspects of the disclosure.
Figure 4:
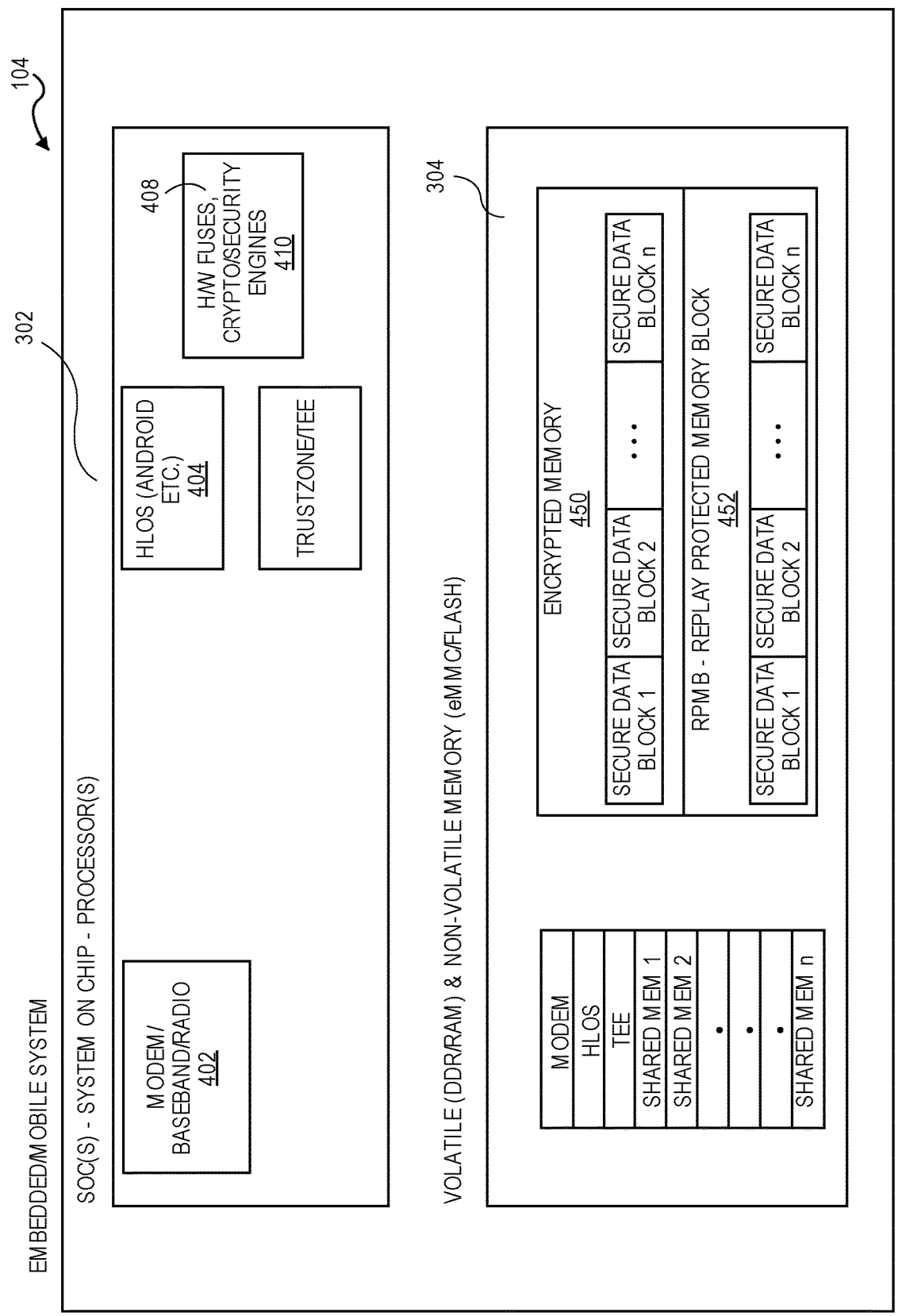
FIG. 4 schematically illustrates an embedded system in accordance with aspects of the disclosure.

FIG. 3 schematically illustrates a device and multi-lock mechanisms in accordance with aspects of the disclosure; and FIG. 4 schematically illustrates an embedded system in accordance with aspects of the disclosure. The disclosure provides a very flexible implementation utilizing multiple independent locks implemented by the multi-lock mechanism 199. Each lock of the multi-lock mechanism 199 may be tied to the same/multiple specific purpose(s)/assets including but not limited to SIM Lock, Service Programming Code (SPC) or Master Subsidy Lock (MSL) Lock, Universal Serial Bus (USB)/port access lock and the like. A combination of assets can be accommodated by the design. Each lock's states/configuration/parameters are secure stored and accessed in secure data blocks present within the system. The independent nature of the individual locks with their unique corresponding unlock keys offers robust security similar to two/multi-factor authentication. The unlock keys can be generated and stored by different parties to add even greater security.

In particular, FIG. 3 shows a system on a chip (SOC 302). The SOC 302 may be an integrated circuit (IC) that integrates all components of a computer or other electronic system into a single chip. It may contain digital, analog, mixed-signal, radio-frequency functions, and the like that may all be arranged on a single chip substrate. In one aspect, the SOC 302 may include an embedded system. In another aspect, the disclosure is directed to a system in package (SiP) that includes a number of chips in a single package.

However, for brevity and simplification of the disclosure, the SOC 302 will be generically referred to within the disclosure but is considered to encompass other constructions as well.

The SOC 302 may include processors and numerous digital peripherals. In one aspect, the SOC 302 may include the processor 114. In another aspect, the processor 114 may be implemented as the SOC 302.

In one aspect, the SOC 302 may be implemented with a ball grid package with lower and upper connections. The lower balls may connect to a board and various peripherals. The upper balls may be configured in a ring holding memory buses used to access a memory 304. In one aspect, the memory 304 may include the memory 116. In another aspect the memory 116 may be implemented as the memory 304. The memory 304 may be implemented with one or more of NAND flash memory, DDR2 (double data rate) RAM (random access memory), eMMC (embedded MultiMediaCard) memory, ROM, RAM, EEPROM, flash memory, replay protected memory block (RPMB), encrypted memory, or the like.

The SOC 302 may include a microcontroller, microprocessor, digital signal processor (DSP) core—multiprocessor SOCS (MPSOC) having more than one processor core or the like. The SOC 302 may include or connect to the memory blocks 304 including one or more of a NAND flash memory, DDR2 (double data rate) RAM (random access memory), eMMC (embedded MultiMediaCard) memory, Read-only memory (ROM), RAM (random access memory), electrically erasable programmable read-only memory (EEPROM), flash memory, replay protected memory block (RPMB), encrypted memory, and the like. The SOC 302 may include timing sources including oscillators and phase-locked loops, peripherals including counter-timers, real-time timers and power-on reset generators, external interfaces that may include USB, FireWire, Ethernet, USART, SPI, analog interfaces including ADCs (analog-to-digital converter) and DACs (digital-to-analog converter). The SOC 302 may include voltage regulators, power management circuits, and a bus.

With particular reference to FIG. 3, the multi-lock mechanism 199 may include a plurality of lock parameters 308 including lock 1, lock 2, . . . Lock n. In order to unlock the multi-lock mechanism 199, multiple unlock parameters 306, which may include keys, need to be applied to the multi-lock mechanism 199 of the SOC 302. In particular, multiple unlock parameters 306 may include unlock 1, unlock 2, . . . unlock n. The multi-lock mechanism 199 may be configured in the SOC 302, the memory blocks 304, and/or both. Each implementation of the lock parameters 308 and unlock parameters 306 of the multi-lock mechanism 199 are described in further detail below.

With reference to FIG. 4, the SOC 302 may include a modem/baseband/radio 402. The modem/baseband/radio 402 may be implemented with the transceiver 120 or may be implemented separately from the transceiver 120. The SOC 302 may further be implemented with a high level operating system (HLOS 404). In one aspect, the HLOS 404 may be implemented with an Android mobile operating system (OS) currently developed by Google and based on the Linux kernel. In another aspect, the SOC 302 may be configured to operate utilizing TrustZone Technology. In another aspect, the SOC 302 may be configured to operate in a Trusted Execution Environment (TEE).

The SOC 302 may be further configured with hardware fuses 408. The hardware fuses 408 may include a variety of fuse technologies that are suitable for programmable key storage and/or the like. The hardware fuses 408 may be programmed using laser or electrical programming methods. In one aspect, the hardware fuses 408 may include laser fuses that may be programmed at probe. In one aspect, the hardware fuses 408 may be implemented as eFuses that may be programmed using on-chip charge pumps which permit the hardware fuses 408 to be configured at probe, final test, and end product production.

The SOC 302 may be further configured with crypto/security engines 410. The crypto/security engines 410 may be implemented as a secure cryptoprocessor. In one aspect, the secure cryptoprocessor may be a dedicated computer or microprocessor for carrying out cryptographic operations. The secure cryptoprocessor may be embedded in a packaging with multiple physical security measures in the SOC 302, which give it a degree of tamper resistance. The secure cryptoprocessor may be configured to not output decrypted data or decrypted program instructions in an environment where security cannot always be maintained.

The memory 304 may further include an encrypted memory portion 450. The encrypted memory portion 450 may include a plurality of secure data blocks (secure data block 1, secure data block 2, . . . secure data block n). The memory 304 may further include a replay protected memory block (RPMB 452). The RPMB 452 may provide an area that allows a portion of memory to be accessed with a hidden security key or trusted security function. The RPMB 452 may provide secure storage for the host to protect crucial programs or data, as well as enable copy protection. The RPMB 452 may include a plurality of secure data blocks (secure data block 1, secure data block 2, . . . secure data block n). Other types of memory are contemplated as well. The memory 304 may further be configured as a secure memory in regards to secure execution in DDR/RAM via memory areas reserved and/or shared by the SOC 302 enforced by the SOC 302 via secure MPUs (Memory Protection Units) in a secure manner and in regards to secure storage in eMMC/Flash via hardware based encryption, integrity, and/or access mechanisms in dedicated partitions such as a baseband file system partition and/or a Replay Protected Memory Block (RPMB) partition.

In one aspect, each lock of the multi-lock mechanism 199 may be configured with one or more states, one or more configurations, and one or more parameters. The states, configurations, and/or parameters may be secure stored and accessed in secure data blocks of the encrypted memory portion 450, the RPMB 452 and/or the like. In one aspect, each lock of the multi-lock mechanism 199 may be configured to have an independent nature with a unique corresponding unlock parameter 306, which may include one or more keys. In one aspect, each unlock parameter 306, which may include one or more keys, of the multi-lock mechanism 199 may be generated and stored by different parties to add even greater security.

The multi-lock mechanism 199 may include one lock utilizing a Network over the air (OTA) HLOS client. OTA refers to various methods of distributing new software updates, configuration settings, updating encryption keys and the like to the device 104. In particular, OTA refers to unlocking at least one lock of the multi-lock mechanism 199. The OTA process may include over-the-air service provisioning (OTASP), over-the-air provisioning (OTAP), over-the-air parameter administration (OTAPA), and the like for the device 104 with the necessary settings with which to access services such as Wireless application protocol (WAP) or Multimedia Messaging Service (MMS).

In one aspect, the OTA may utilize SMS for unlocking at least one lock of the multi-lock mechanism 199. The OTA messaging may be utilized to provide a remote control of the device 104. The OTA process may utilize standards associated with the Open Mobile Alliance (OMA) and/or GSM 03.48 series.

The multi-lock mechanism 199 may include one lock utilizing a TrustZone Security Extension. The TrustZone Security Extension may be implemented in ARMv6KZ, later application profile architectures, and/or similar architecture. The TrustZone Security Extension may provide a low-cost alternative to adding another dedicated security core to the SOC 302. The TrustZone Security Extension may provide two virtual processors backed by hardware based access control. In this regard, the application core may switch between two states, referred to as worlds. Utilization of the two states may prevent and/or limit information from leaking from a more trusted world to a less trusted world. This may be implemented with a world switch. The world switch may generally be orthogonal to all other capabilities of the processor. Accordingly, each world may operate independently of the other world while using the same core. The memory and the peripherals may then be made aware of the operating world of the core and may use the particular operating world to provide access control to secrets and code on the device 104.

Typical applications of the TrustZone Technology may run a rich operating system in the less trusted world, and may run a smaller security-specialized code in the more trusted world, allowing much tighter digital rights management for controlling the use of media on the device 104, such as ARM-based devices, and preventing any unapproved use of the device 104.

The multi-lock mechanism 199 may include one lock utilizing a Trusted Execution Environment. The Trusted Execution Environment (TEE) may be implemented as a secure area of the processor 114 and/or the SOC 302 of the device 104. The TEE may ensure code and data may be protected with respect to confidentiality and integrity. The TEE may be implemented as an isolated execution environment and may provide security features such as isolated execution, integrity of Trusted Applications along with confidentiality of associated assets. The TEE may also offer an execution space that may provide a higher level of security. In one aspect, the TEE may require an SMS using unlock codes and/or certificates as well as manual unlocking via entry of unlock codes by an end user.

The TEE may be implemented as an isolated environment that may run in parallel with the device 104 operating system (OS) and may provide security for the rich environment. Various applications running in the TEE may have access to the full power of the processor 114, the SOC 302, memory block 304, and/or the memory 116 of the device 104. Moreover the TEE may include hardware isolation that may protect the processor 114, the SOC 302, memory block 304, and/or the memory 116 of the device 104 from user installed apps running in a main operating system. Software and cryptographic isolation inside the TEE may protect the trusted applications contained within from each other.

The multi-lock mechanism 199 may include one lock utilizing a service provider code lock. The service provider code lock may require corresponding unlock codes. The service provider code may be unique to each device 104. In one particular aspect, the service provider code may depend on an IMEI of the device 104.

The multi-lock mechanism 199 may include one lock utilizing a Master Subsidy Lock. In one aspect, the Master Subsidy Lock may include a numeric code that may prevent a user from accessing certain technical settings of the device 104.

The multi-lock mechanism 199 may include one lock utilizing a USB lock. The USB lock may be implemented utilizing a USB/Port Security permission sets. A permission set may be a container that defines a set of devices and the type of access that is allowed for the device 104. The permission set may include view, write, full control and deny.

The multi-lock mechanism 199 may be configured with a timing parameter that requires each of the lock parameters 308 to be provided the unlock parameters 306 in a timely manner. In this regard, an unauthorized application of the unlock parameters 306 may require additional time when utilized by a hacker. Accordingly, the multi-lock mechanism 199 may time out and reduce the ability for the hacker to break the system and accordingly reduce a chance of the hacker at being successful.

The multi-lock mechanism 199 may include run-time integrity checking. The run-time integrity checking may include an analysis and execution approach based on extracting information from a running system of the SOC 302 and using the information to detect and possibly react to observed behaviors satisfying or violating certain properties. The run-time integrity checking may include verification specifications that may be expressed in trace predicate formalisms, such as finite state machines, regular expressions, context-free patterns, linear temporal logics, etc., or extensions of these. Should the multi-lock mechanism 199 run-time integrity checking verification specifications fail due to unauthorized access, the multi-lock mechanism 199 may default lock.

The multi-lock mechanism 199 may include tamper detection feature to help proactively detect and take action against fraudulent unauthorized unlocking and/or hacking activity. This feature may be securely residing in a secure system within the SOC 302 of the device 104. The tamper detection feature may transparently run to monitor a security profile of the device 104 as well as critical security data related to the multi-lock mechanism 199 implemented on the device 104. The scope of the tamper detection feature may involve monitoring of volatile as well as non-volatile memory, such as the memory blocks 304 and the memory 116. The tamper detection feature may take appropriate action once tamper has been detected including but not limited to blowing dedicated hardware fuses 408, such as tamper e-fuses, reporting of tampering activity over a communication channel for threat intelligence purposes as well as removing the ability to unlock the multi-lock mechanism 199. The tamper detection feature may deter fraudulent users and/or hackers and moreover help maintain revenue, subsidy, and/or intellectual property as well as help generate the threat intelligence retrieved in order to enhance the implementation of the multi-lock mechanism 199.

In one or more aspects, the multi-lock mechanism 199 may have a secure default lock state via utilization of dedicated secure state hardware e-fuse(s) 408. This secure default lock state may allow the multi-lock mechanism 199 to more accurately determine between a device 104 that has been securely provisioned for production vs. a device 104 that is in a factory state.

Figure 5:
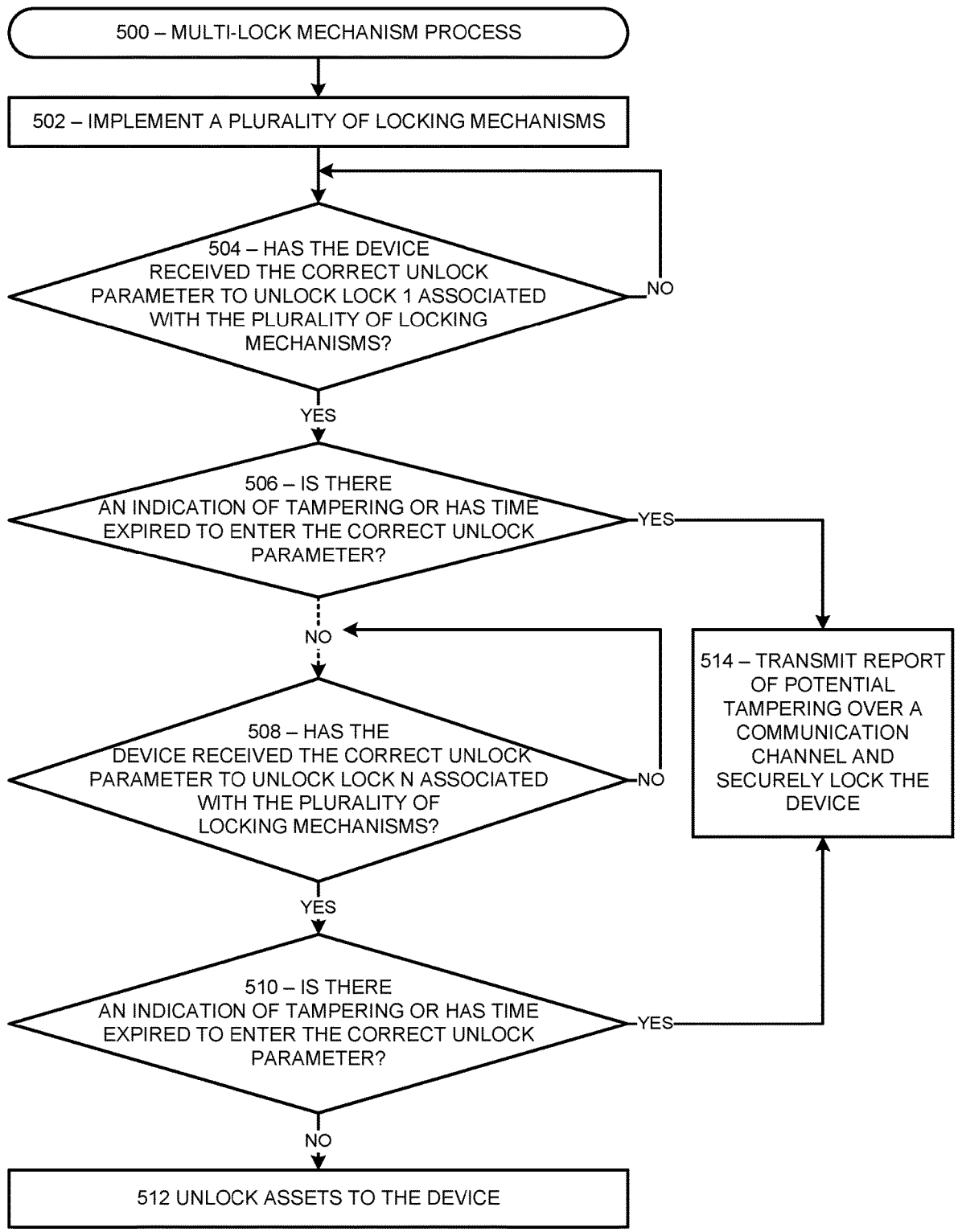
FIG. 5 illustrates a process in accordance with aspects of the disclosure.

FIG. 5 illustrates a process in accordance with aspects of the disclosure. In particular, FIG. 5 illustrates an exemplary multi-lock mechanism process 500 applying one or more of the aspects of the disclosure. As shown in block 502, the device 104 may implement a plurality of locking mechanisms consistent with the disclosure. In block 504, the process 500 may determine whether the device 104 has received the correct unlock parameter to unlock lock 1 associated with the plurality of locking mechanisms. If the device 104 has not received the correct unlock parameter to unlock lock 1, the process will loop until the correct unlock parameter is provided.

In block 506, the process 500 may determine whether there an indication of tampering or has time expired to enter the correct unlock parameter. If there is an indication of tampering or time has expired, the process will advance to block 514. Otherwise the process 500 will advance to block 508. In block 514, the device 104 may transmit a report of potential tampering over a communication channel and securely lock the device 104.

In block 508, the process may determine whether the device 104 has received the correct unlock parameter to unlock lock n associated with the plurality of locking mechanisms. If the device 104 has not received the correct unlock parameter to unlock lock n, the process will loop until the correct unlock parameter is provided.

In block 510, the process 500 may determine whether there is an indication of tampering or has time expired to enter the correct unlock parameter. If there is an indication of tampering or time has expired, the process will advance to block 514. Otherwise the process 500 will advance to block 512. In block 512, the process 500 may unlock assets to the device 104. As noted by the dotted line connecting block 506 and 508, the disclosure further contemplates additional locks consistent with the disclosure could be implemented in the process 500.

As disclosed, the solution that includes the device 104 and the multi-lock mechanism 199 takes advantage of the entire mobile/embedded system architecture to provide a more secure design. The disclosure allows for multiple security layers with independent checks and balances within the device 104. The solution involves multiple systems present within the device 104 and/or SOC 302 including the disclosed processor, such as Modem/Baseband/Radio/Call Processor, the High Level Operating System (HLOS) such as Android, and/or a Trusted Execution Environment (TEE) utilizing features such as TrustZone. As disclosed, the device 104 and/or SOC 302 may utilize hardware based e-fuses, crypto/security engines, and keys. In addition, the device 104 and/or the SOC 302 takes advantage of secure memory in regards to secure execution in DDR/RAM via memory areas reserved/shared by system(s) enforced by the system via secure MPUs (Memory Protection Units) in a secure manner and in regards to secure storage in eMMC/Flash via hardware based encryption, integrity, and/or access mechanisms in dedicated partitions such as the baseband file system partition or Replay Protected Memory Block (RPMB) partition. Implementations based on the disclosure are more difficult and complex for an attacker/hacker to break requiring significantly intensive effort involving multiple systems, locations, and interfaces which would then have to be exploited simultaneously in a timely manner without breaking the system to have a chance at being successful.

In addition, as set forth by the disclosure the device 104 and/or SOC 302 will be active and smart as it may have a run-time integrity checking and/or a tamper detection feature to help proactively detect and take action against fraudulent unauthorized unlocking/hacking activity. This feature will be securely residing in a secure system within the device and transparently run to monitor the security profile of the device as well as critical security data related to the multiple lock(s) implemented on the device. Its scope may involve monitoring of volatile as well as non-volatile memory and it can take appropriate action once tamper has been detected including but not limited to blowing dedicated tamper e-fuse(s), reporting of tampering activity for threat intelligence purposes as well as removing the ability to unlock the multiple lock(s). This will deter fraudulent users/hackers to help maintain revenue, subsidy and/or intellectual property as well as generate the threat intelligence that may be essential in enhancing the solution and its implementation such as the addition of multiple lock(s) as needed.

Similar to the tamper detection feature, the multi-lock mechanism 199 may ensure that the system always comes up in a secure default lock state via utilization of dedicated secure state hardware e-fuse(s). This will allow the solution to accurately determine between a device that has been securely provisioned for production vs. a device that is in a factory state.

Finally, the disclosed device and process is extremely modular, scalable and portable as it is multi-functional and can be utilized on mobile/embedded systems in multiple industries including but not limited to wireless, automotive, PC, medical devices, and the like. The disclosed device and process may also work on different vendor platforms in context of multiple chipset vendors, SOC vendors, handset manufacturers, and/or service providers.

For the purposes of this disclosure a computer readable medium stores computer data, which data can include computer program code that is executable by a processor of the SIM, the mobile device and/or the device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein. In a particular aspect, the multi-lock mechanism 199 may be implemented as a hardware unit.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A device configured to implement multiple locks to increase security of assets associated with the device comprising:

an embedded system;

a multi-lock mechanism configured to provide a plurality of locks to prevent an unauthorized access to assets associated with the embedded system and wherein at least one of the plurality of locks of the multi-lock mechanism comprises a secure default lock state;

each of the plurality of locks of the multi-lock mechanism having lock parameters and each of the plurality of locks of the multi-lock mechanism having different unlock parameters;

a memory in communication with the embedded system, the memory configured to securely store at least one of the following: the lock parameters of the plurality of locks of the multi-lock mechanism and the unlock parameters of the plurality of locks of the multi-lock mechanism;

the memory further configured to securely store at least one of the unlock parameters of the multi-lock mechanism, wherein the memory comprises one of the following: a NAND flash memory, double data rate (DDR2) random access memory (RAM), a replay protected memory block (RPMB) memory, an encrypted memory portion, a random access memory (RAM), and an embedded (MultiMediaCard) memory; and the embedded system further configured to provide access to the assets associated with the embedded system after each of the lock parameters of the plurality of locks of the multi-lock mechanism is provided the unlock parameters of the multi-lock mechanism, wherein the device comprises one of the following: a wireless device, an appliance, a consumer electronic, a vehicle related device, a server, and a medical device.

2. The device according to claim 1 wherein the plurality of locks of the multi-lock mechanism are implemented with at least two of the following: a trustzone security extension, a trusted execution environment, and a network over the air (OTA) high level operating system (HLOS) client.

3. The device according to claim 1 wherein the plurality of locks of the multi-lock mechanism are implemented with at least two of the following: a trustzone security extension, a trusted execution environment, a network over the air (OTA) high level operating system (HLOS) client, a service provider code lock, a master subsidy lock, and a port security permission set lock.

4. The device according to claim 1 wherein the plurality of locks of the multi-lock mechanism are implemented with at least three of the following: a trustzone security extension, a trusted execution environment, a network over the air (OTA) high level operating system (HLOS) client, a service provider code lock, a master subsidy lock, and a port security permission set lock.

5. The device according to claim 1 further comprising hardware fuses implemented with the embedded system configured to blow in response to tampering.

6. The device according to claim 1 further comprising a crypto/security engine implemented with the embedded system.

7. The device according to claim 1 wherein the embedded system is implemented with a high level operating system (HLOS); and wherein the embedded system comprises a system on a chip.

8. The device according to claim 1 wherein the embedded system is configured to execute run-time integrity checking.

9. The device according to claim 1 wherein the embedded system is configured to execute a tamper detection feature that transparently runs to monitor a security profile.

10. The device according to claim 1 wherein the embedded system comprises a timing parameter that requires each of the lock parameters to be provided the unlock parameters in a timely manner.

11. A process configured to implement multiple locks to increase security of assets associated with a device comprising:
  implementing the device with an embedded system;
  providing a multi-lock mechanism with a plurality of locks to prevent an unauthorized access to assets associated with the embedded system and wherein at least one of the plurality of locks of the multi-lock mechanism comprises a secure default lock state;
  implementing each of the plurality of locks of the multi-lock mechanism with lock parameters and implementing each of the plurality of locks of the multi-lock mechanism with different unlock parameters;
  securely storing at least one of the following: the lock parameters of the plurality of locks of the multi-lock mechanism and the unlock parameters of the plurality of locks of the multi-lock mechanism;
  securely storing at least one of the unlock parameters of the multi-lock mechanism in a memory in communication with the embedded system, wherein the memory comprises one of the following: a NAND flash memory, double data rate (DDR2) random access memory (RAM), a replay protected memory block (RPMB) memory, an encrypted memory portion, a random access memory (RAM), and an embedded (MultiMediaCard) memory; and
  providing access to the assets associated with the embedded system after each of the lock parameters of the plurality of locks of the multi-lock mechanism is provided the unlock parameters of the multi-lock mechanism of the embedded system,
  wherein the device comprises one of the following: a wireless device, an appliance, a consumer electronic, a vehicle related device, a server, and a medical device.

12. The process according to claim 11 wherein the plurality of locks of the multi-lock mechanism are implemented with at least two of the following: a trustzone security extension, a trusted execution environment, and a network over the air (OTA) high level operating system (HLOS) client.

13. The process according to claim 11 wherein the plurality of locks of the multi-lock mechanism are implemented with at least two of the following: a trustzone security extension, a trusted execution environment, a network over the air (OTA) high level operating system (HLOS) client, a service provider code lock, a master subsidy lock, and a port security permission set lock.

14. The process according to claim 11 wherein the plurality of locks of the multi-lock mechanism are implemented with at least three of the following: a trustzone security extension, a trusted execution environment, a network over the air (OTA) high level operating system (HLOS) client, a service provider code lock, a master subsidy lock, and a port security permission set lock.

15. The process according to claim 11 further comprising implementing hardware fuses with the embedded system configured to blow in response to tampering.

16. The process according to claim 11 further comprising implementing a crypto/security engine with the embedded system.

17. The process according to claim 11 wherein the embedded system is implemented with a high level operating system (HLOS); and wherein the embedded system comprises a system on a chip.

18. The process according to claim 11 further comprising implementing a run-time integrity checking with the embedded system.

19. The process according to claim 11 further comprising implementing a tamper detection feature that transparently runs to monitor a security profile with the embedded system.

20. The process according to claim 11 further comprising implementing a timing parameter that requires each of the lock parameters to be provided the unlock parameters in a timely manner with the embedded system.

* * * * *